(12) United States Patent
Ritzer et al.

(10) Patent No.: US 11,439,057 B2
(45) Date of Patent: Sep. 13, 2022

(54) GREEN AREA MAINTENANCE SYSTEM, METHOD FOR SENSING AT LEAST ONE SECTION OF A DELIMITING BORDER OF AN AREA TO BE MAINTAINED, AND METHOD FOR OPERATING AN AUTONOMOUS MOBILE GREEN AREA MAINTENANCE ROBOT

(71) Applicant: Andreas Stihl AG & Co. KG, Waiblingen (DE)

(72) Inventors: Peter Ritzer, Ebbs (AT); Matthias Hans, Kiefersfelden (DE); Andreas Strohmaier, Weissach (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 385 days.

(21) Appl. No.: 16/620,026

(22) PCT Filed: Jun. 8, 2018

(86) PCT No.: PCT/EP2018/065227
§ 371 (c)(1),
(2) Date: Dec. 6, 2019

(87) PCT Pub. No.: WO2018/224678
PCT Pub. Date: Dec. 13, 2018

(65) Prior Publication Data
US 2020/0093058 A1    Mar. 26, 2020

(30) Foreign Application Priority Data
Jun. 9, 2017 (EP) .................................... 17175378

(51) Int. Cl.
*A01D 34/00* (2006.01)
*A01B 69/04* (2006.01)
(Continued)

(52) U.S. Cl.
CPC .......... *A01D 34/008* (2013.01); *A01B 69/008* (2013.01); *G05D 1/0088* (2013.01);
(Continued)

(58) Field of Classification Search
CPC .. A01D 34/008; A01D 34/90; A01D 2101/00; G05D 1/0088; G05D 1/0278; G05D 2201/0208
See application file for complete search history.

(56) References Cited

U.S. PATENT DOCUMENTS

| | | | |
|---|---|---|---|
| 6,255,793 B1 | 7/2001 | Peless et al. | |
| 2004/0163373 A1* | 8/2004 | Adams | A01D 34/78 56/10.2 R |

(Continued)

FOREIGN PATENT DOCUMENTS

| | | |
|---|---|---|
| CN | 101604450 A | 12/2009 |
| CN | 103472823 A | 12/2013 |

(Continued)

OTHER PUBLICATIONS

English Translation of the Written Opinion of the International Search Authority for PCT/EP2018/065227, dated 2018. URL is https://globaldossier.uspto.gov/#/details/EP/PCT%252FEP2018%252F065227/W/88351 (Year: 2018).*

(Continued)

*Primary Examiner* — Calvin Cheung
(74) *Attorney, Agent, or Firm* — Crowell & Moring LLP

(57) ABSTRACT

A green area maintenance system includes a motor scythe, a scythe position determining device for determining scythe position coordinates, and a position recording device. The scythe position determining device is attached to the motor scythe. The position recording device is designed for recording a series of scythe position coordinates of a delimiting border while the motor scythe is being guided together with (Continued)

the scythe position determining device along the delimiting border of an area to be maintained.

14 Claims, 3 Drawing Sheets

(51) Int. Cl.
    *G05D 1/00*            (2006.01)
    *G05D 1/02*            (2020.01)
    *A01D 34/90*          (2006.01)
    *A01D 101/00*        (2006.01)

(52) U.S. Cl.
    CPC ........... *G05D 1/0278* (2013.01); *A01D 34/90* (2013.01); *A01D 2101/00* (2013.01); *G05D 2201/0208* (2013.01)

(56) References Cited

U.S. PATENT DOCUMENTS

| | | |
|---|---|---|
| 2013/0345922 A1 | 12/2013 | Biber |
| 2014/0012418 A1* | 1/2014 | Johnson ................ A01D 34/00 700/258 |
| 2014/0208599 A1 | 7/2014 | Nagahama |
| 2014/0257620 A1 | 9/2014 | Biber |
| 2016/0007526 A1* | 1/2016 | Greulich .............. A01D 69/002 56/14.7 |
| 2016/0031087 A1 | 2/2016 | Altman et al. |
| 2017/0072523 A1 | 3/2017 | Gerstenberger et al. |
| 2017/0208599 A1 | 7/2017 | Nigam et al. |
| 2019/0265725 A1 | 8/2019 | Shao et al. |
| 2021/0029873 A1 | 2/2021 | Yamauchi et al. |

FOREIGN PATENT DOCUMENTS

| | | |
|---|---|---|
| CN | 1038899205 A | 6/2014 |
| CN | 105988471 A | 10/2016 |
| CN | 106489103 A | 3/2017 |
| CN | 106514568 A | 3/2017 |
| DE | 10 2012 221 572 A1 | 5/2014 |
| EP | 2 806 325 A2 | 11/2014 |
| EP | 2 946 650 B1 | 8/2017 |
| EP | 3 540 552 A1 | 9/2019 |
| TW | 200415368 A | 8/2004 |
| WO | WO 2012/089679 A1 | 7/2012 |

OTHER PUBLICATIONS

International Search Report (PCT/ISA/210) issued in PCT Application No. PCT/EP2018/065227 dated Jul. 25, 2018 with English translation (eight (8) pages).

German-language Written Opinion (PCT/ISA/237) issued in PCT Application No. PCT/EP2018/065227 dated Jul. 25, 2018 (nine (9) pages).

Chinese-language Office Action issued in Chinese Application No. 201880038133.4 dated Oct. 29, 2021 (10 pages).

German-language European Office Action issued in European Application No. 20187816.2 dated Jun. 29, 2022 (five (5) pages).

\* cited by examiner

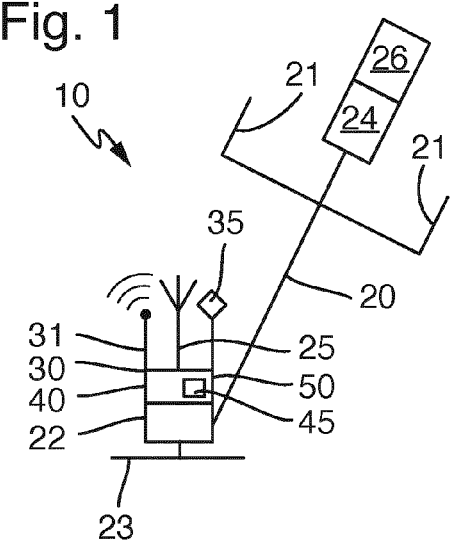
Fig. 1
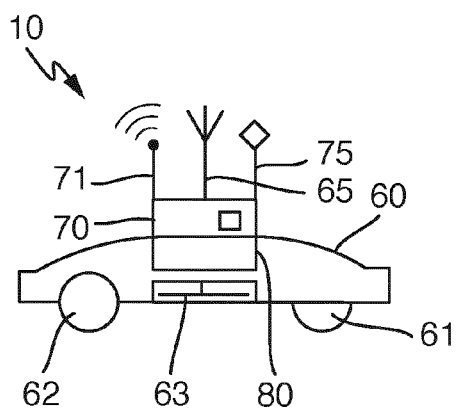
Fig. 2
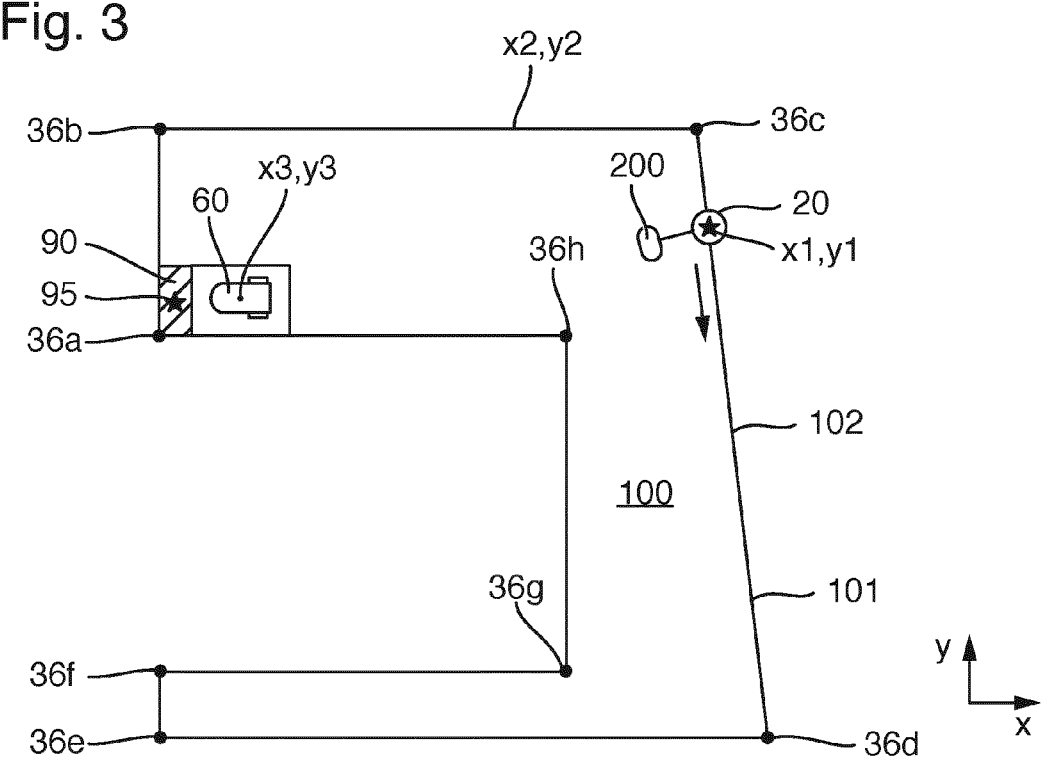
Fig. 3
Fig. 4

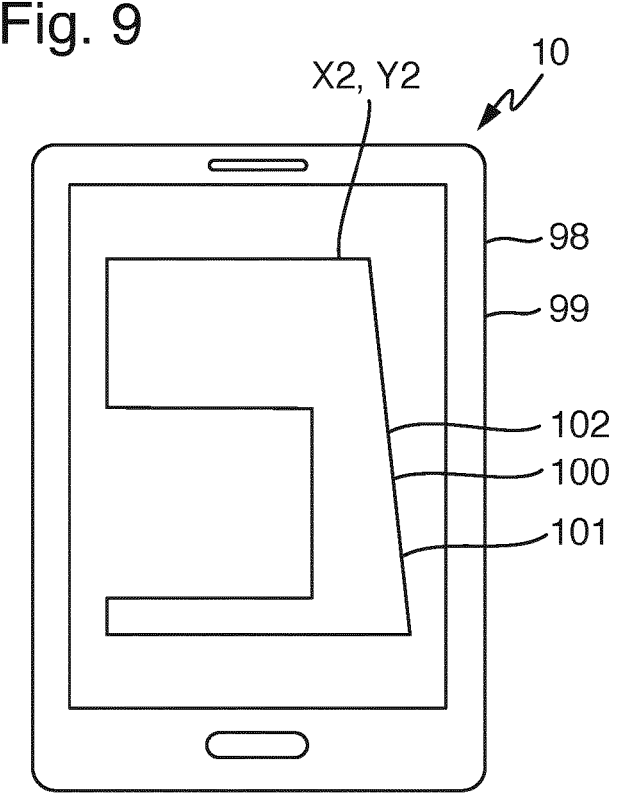

GREEN AREA MAINTENANCE SYSTEM, METHOD FOR SENSING AT LEAST ONE SECTION OF A DELIMITING BORDER OF AN AREA TO BE MAINTAINED, AND METHOD FOR OPERATING AN AUTONOMOUS MOBILE GREEN AREA MAINTENANCE ROBOT

BACKGROUND AND SUMMARY OF THE INVENTION

The invention relates to a green area maintenance system, a method for sensing at least one section of a delimiting border of an area to be maintained by means of a green area maintenance system, in particular such a green area maintenance system, and a method for operating an autonomous mobile green area maintenance robot of a green area maintenance system, in particular such a green area maintenance system, on such an area to be maintained with such a delimiting border.

A green area maintenance system with a motor scythe is known.

The invention addresses the problem of providing a green area maintenance system that has improved properties, in particular more functionalities. Furthermore, the invention addresses the problem of providing a method for sensing at least one section of a delimiting border of an area to be maintained and a method for operating an autonomous mobile green area maintenance robot.

The invention solves this problem by providing a green area maintenance system and by providing a method in accordance with the claimed invention.

The green area maintenance system according to the invention has a motor scythe, a scythe position determining device and a position recording device. The scythe position determining device is designed for determining scythe position coordinates. The scythe position determining device is attached to the motor scythe. The position recording device is designed for the purpose of recording and/or storing a series of scythe position coordinates of a delimiting border, in particular at least one section of a delimiting border, while the motor scythe is being guided together with the scythe position determining device along the delimiting border, in particular at least one section of the delimiting border, of an area to be maintained.

The green area maintenance system makes it possible to maintain a region of the area to be maintained, in particular a border region and/or edge region, or the complete area to be maintained by means of the motor scythe. In addition, the green area maintenance system makes it possible to sense the delimiting border, in particular the at least one section of the delimiting border, of the area to be maintained by means of the scythe position determining device and the position recording device.

Advantageously, the position recording device may be attached to the motor scythe.

The area to be maintained may be for example an outdoor area, in particular unsealed ground, or a green area, such as a grassed area with lawns. The delimiting border may be defined by a wall, a fence or in some other way.

Advantageously, the motor scythe may be designed for cutting and/or mowing grass, herbaceous plants, woody undergrowth or smaller trees/shrubs. In particular, the motor scythe may be referred to as a brushcutter, grass trimmer, lawn trimmer, grass cutter, lawn cutter, grass shears and/or lawn shears.

Advantageously, the motor scythe may have a cutting tool, which may be at least partially exposed and/or open or freely accessible during the operation of the motor scythe. In other words: the cutting tool may be unguarded. To put it another way: the cutting tool need not be covered, in particular completely, by means of a protective housing that is open, in particular open at the bottom, or be arranged, in particular completely, in a safety zone defined thereby. This can make it possible for the area to be maintained up to the delimiting border. Generally, lawnmowers have protective housings that are open, in particular at the bottom, in the safety zones of which lawnmowing tools are completely arranged.

In particular, the motor scythe does not need to have any running wheels for guiding and/or moving it on the area. Lawnmowers generally have running wheels for moving them.

In addition or as an alternative, the motor scythe may be different from a lawnmower and/or a green area maintenance robot, in particular an autonomous mobile green area maintenance robot, in particular a lawnmowing robot.

In a development of the invention, the motor scythe has a user carrying device. The user carrying device is designed for the carrying of the motor scythe by a user. Advantageously, the user carrying device may comprise a handle construction for holding, in particular if the motor scythe is relatively lightweight, and/or a carrying strap and/or a carrying harness for putting on, in particular if the motor scythe is relatively heavy.

In addition or as an alternative, the motor scythe may have a user operating unit, which may be designed for the operating of the motor scythe or its cutting tool by a user. Advantageously, the user operating unit may be connected in a mechanically fixed, in particular rigid, manner to the cutting tool by means of a handle or pole, in particular an extended handle or pole. In particular, the user operating unit may be connected in a mechanically fixed, in particular rigid, manner to the cutting tool by means of the user carrying device or be arranged in a mechanically fixed, in particular rigid, manner thereon. Rigidly connected or arranged may mean that the operating unit cannot be detached from the cutting tool without using a tool.

In a development of the invention, the motor scythe has a scythe head with a cutting tool. The scythe position determining device is attached in the region of the cutting tool. In the region of the cutting tool may mean that the scythe position determining device may be relatively closer to the cutting tool than the user carrying device, if present. Advantageously, the scythe position determining device may be attached to the scythe head. In particular, the cutting tool may comprise at least one mowing line, at least one plastic cutter, at least one metal cutter and/or a metal cutting blade with at least one cutting edge and/or with at least one cutting tooth. Advantageously, the cutting tool may be designed as a rotating cutting tool and for the purpose of mowing the material to be mowed by what is referred to as the free cutting method without a counter blade, in particular to produce a cutting operation by the centrifugal force of the cutting tool. If the cutting tool comprises the mowing line, the scythe head may be referred to as a line head. In addition or as an alternative, the cutting tool need not be designed as a rotating cutting tool. In particular, the cutting tool may be designed as a linearly moving or reciprocative or translatory cutting tool. Also in addition or as an alternative, the cutting tool may have a counter blade.

In a development of the invention, the scythe position determining device comprises a satellite position determining receiver for determining scythe position coordinates. Advantageously, the satellite position determining receiver may be designed for one or more satellite position determining systems such as NAVSTAR GPS, GLONASS, Galileo and/or BeiDou.

In a development of the invention, the scythe position determining device comprises a local positioning system device for determining scythe position coordinates. Advantageously, the local positioning system device may be based on one or more different technologies, such as distance measurements to node points, optical signals, radio waves, magnetic fields, acoustic signals, ultra-wideband, Bluetooth, WLAN, ultrasound and/or RFID. In particular, the local positioning system device may be a receiver and/or a transmitter. In addition or as an alternative, the local positioning system device may be an active element and/or a passive element.

In a development of the invention, the green area maintenance system has a computing and storing unit. The computing and storing unit is designed for the purpose of determining and storing a series of delimiting border coordinates of the delimiting border, in particular at least the section of the delimiting border, of the area to be maintained on the basis of the recorded series of scythe position coordinates of the delimiting border, in particular at least the section of the delimiting border. Advantageously, the computing and storing unit may be designed for the purpose of determining the series of delimiting border coordinates by means of smoothing and/or filtering the series of scythe position coordinates. In particular, the computing and storing unit may be designed for the purpose of logically differentiating between scythe position coordinates that have been determined and recorded on the delimiting border and scythe position coordinates that have been determined and recorded within the delimiting border. Advantageously, the computing and storing unit may be attached to the motor scythe.

In a development of the invention, the green area maintenance system has an autonomous mobile green area maintenance robot, a robot position determining device and a control unit. The robot position determining device is designed for determining robot position coordinates. The robot position determining device is attached to the green area maintenance robot. The control unit is designed for the purpose of controlling a movement of the green area maintenance robot on the area to be maintained in dependence on the determined robot position coordinates and the recorded series of scythe position coordinates of the delimiting border, in particular at least the section of the delimiting border, and/or the determined and stored series of delimiting border coordinates of the delimiting border, in particular at least the section of the delimiting border, in such a way that the green area maintenance robot stays on the area to be maintained, in particular within the delimiting border. This can make possible autonomous maintenance of the area to be maintained by means of the autonomous mobile green area maintenance robot. Autonomous maintenance may mean that the autonomous mobile green area maintenance robot and/or the control unit may be designed for the purpose that the green area maintenance robot can move and/or act on the area to be maintained in a self-reliant, self-acting, self-determined or self-controlled manner and/or independently of the user and/or can select at least one parameter, such as in particular a route parameter, and/or a turning point. Autonomous maintenance may additionally or alternatively mean that the green area maintenance robot and/or the control unit may be designed for the purpose that the green area maintenance robot can automatically begin working and/or end working. During autonomous maintenance, the green area maintenance robot need not be controlled by the user, in particular not remotely controlled. In other words, during autonomous maintenance, the green area maintenance robot can in particular work without human control and/or guidance. The autonomous mobile green area maintenance robot may be referred to as a service robot. The green area maintenance robot may advantageously have a maintenance tool, which may be different in particular from the cutting tool, if present, of the motor scythe. In particular, the green area maintenance robot may comprise the control unit.

In a development, the green area maintenance system has a scythe transmission unit. The scythe transmission unit is designed for interacting with the scythe position determining device, the position recording device and/or the computing and storing unit, if present, and for the data transmission, in particular wireless and/or cableless data transmission, of scythe position coordinates, the series of scythe position coordinates and/or the series of delimiting border coordinates. In addition or as an alternative, the green area maintenance system has a robot transmission unit. The robot transmission unit is designed for interacting with the control unit, if present, and for the data transmission, in particular wireless and/or cableless data transmission, of scythe position coordinates, the series of scythe position coordinates and/or the series of delimiting border coordinates. Advantageously, the scythe transmission unit and the robot transmission unit may be designed for data transmission from the scythe transmission unit to the robot transmission unit. In particular, the scythe transmission unit may be attached to the motor scythe. In particular, the robot transmission unit may be attached to the autonomous mobile green area maintenance robot.

In a development, the scythe position determining device is of a portable design. In particular, the scythe position determining device may form the robot position determining device. In addition or as an alternative, the position recording device is of a portable design. Also in addition or as an alternative, the computing and storing unit, if present, may be of a portable design. This makes simple data transmission possible. Advantageously, the scythe position determining device may be designed for detachable attachment to the motor scythe and/or the autonomous mobile green area maintenance robot, if present. Advantageously, the position recording device may be designed for detachable attachment to the motor scythe and/or the autonomous mobile green area maintenance robot, if present, and/or the control unit, if present. Advantageously, the computing and storing unit may be designed for detachable attachment to the motor scythe and/or the autonomous mobile green area maintenance robot, if present, and/or the control unit, if present.

In a refinement of the invention, the autonomous mobile green area maintenance robot is designed as a lawnmowing robot with a lawnmowing tool. In particular, the green area maintenance robot may be designed as a mulching mowing robot. The lawnmowing tool may be different from the cutting tool, if present, of the motor scythe. Advantageously, the lawnmowing tool may comprise at least one mowing line, at least one plastic cutter, at least one metal cutter and/or a metal cutting blade with at least one cutting edge and/or with at least one cutting tooth. Advantageously, the lawnmowing tool may be designed as a rotating lawnmowing tool and for the purpose of mowing the material to be mowed by what is referred to as the free cutting method without a counter blade, in particular to produce a cutting operation by the centrifugal force of the lawnmowing tool.

Furthermore, the invention relates to a method for sensing at least the section of the delimiting border of the area to be maintained, in particular by the motor scythe and/or the autonomous mobile green area maintenance robot, if present, by means of the previously described green area maintenance system. The method according to the invention comprises the steps of: a) Guiding the motor scythe along the section, in particular by the user, the scythe position determining device being attached to the motor scythe. b) Determining scythe position coordinates by means of the scythe position determining device during the guiding. c) Recording the series of scythe position coordinates of the delimiting border, in particular at least the section of the delimiting border, by means of the position recording device. The method makes it possible to maintain a region of the area to be maintained, in particular a border region and/or edge region, or the complete area to be maintained by means of the motor scythe. In addition, the method makes it possible to sense the delimiting border, in particular the at least one section of the delimiting border, of the area to be maintained by means of the scythe position determining device and the position recording device. In particular, step c) may be performed at the same time as steps a) and b) and/or at a time thereafter.

In a development of the invention, the method comprises the step of: d) Determining and storing the series of delimiting border coordinates of the delimiting border, at least the section of the delimiting border, of the area to be maintained on the basis of the recorded series of scythe position coordinates of the delimiting border, in particular at least the section of the delimiting border, by means of the computing and storing unit. In particular, step d) may be performed at the same time as step c) and/or at a time thereafter.

The invention also relates to a green area maintenance system, in particular the green area maintenance system. The green area maintenance system according to the invention has an autonomous mobile green area maintenance robot, in particular the autonomous mobile green area maintenance robot, a border sensing device, in particular the and/or only a single border sensing device, a recording device, in particular the recording device, and a control unit, in particular the control unit. The border sensing device is designed for sensing position-related or location-related data, in particular position data, of an area to be maintained, in particular the area to be maintained, in particular at least one section thereof, in particular the section thereof, of a delimiting border, in particular the delimiting border. Furthermore, the border sensing device is preferably designed for detachable attachment to the green area maintenance robot, in particular for re-detachable, non-destructive and/or tool-free attachment, in particular by the user. The recording device is preferably designed for the purpose of recording and/or storing a series, in particular the series, of border data sensed by means of the border sensing device of the delimiting border, in particular at least the section of the delimiting border, while the border sensing device is detached from the green area maintenance robot and is being guided, in particular at the same time, along the delimiting border, in particular the section of the delimiting border, in particular by the user, in particular recording the data only when the border sensing device is detached. The control unit is designed for the purpose of controlling a movement, in particular the movement, of the green area maintenance robot on the area to be maintained in dependence on robot data, in particular sensed by means of the border sensing device, and the recorded series of border data while the border sensing device is attached to the green area maintenance robot, in particular at the same time, in such a way that the green area maintenance robot stays on the area to be maintained, in particular within the delimiting border, in particular controlling the movement only when the border sensing device is attached.

The green area maintenance system makes it possible to sense the delimiting border, in particular the at least one section of the delimiting border, of the area to be maintained by means of the border sensing device and the recording device, in particular without the green area maintenance robot needing to be guided in particular therefor along the delimiting border, in particular the section of the delimiting border, in particular by the user. Consequently, the green area maintenance system can be user friendly. Furthermore, the green area maintenance system can make it possible to make do with the, in particular single, border sensing device; or the, in particular single, border sensing device may be sufficient. In other words: it is possible to dispense with a further border sensing device. Consequently, the green area maintenance system can be inexpensive. In addition, a difference or an offset with respect to the border sensing, as could occur in particular in the case of a border sensing device for sensing the border data and a further border sensing device for sensing the robot data, can be avoided. Consequently, the green area maintenance system or the use of the same border sensing device for sensing both the border data and the robot data can make possible a relatively accurate border sensing, in particular a relatively accurate position determination.

In particular, the green area maintenance robot may be entirely or partially designed as described above. In addition or as an alternative, the green area maintenance robot may comprise the control unit. Also in addition or as an alternative, the green area maintenance robot may be designed for interacting with the border sensing device and/or the recording device and/or the control unit.

Also in addition or as an alternative, the border sensing device may be entirely or partially designed as described above. Also in addition or as an alternative, the border sensing device may be detached, in particular by the user, for the sensing and for the recording of the border data and/or for the guiding, in particular by the user, of the green area maintenance robot. In particular, detached may be used to refer to not attached or in particular spatially separate. After the sensing and recording and/or the guiding, the border sensing device may be attached to the green area maintenance robot, in particular by the user. In other words: for controlling the movement of the green area maintenance robot, the border sensing device may be attached to the green area maintenance robot, in particular by the user. Also in addition or as an alternative, the attachment may comprise a form-fitting, force-fitting and/or material-bonding connection. Also in addition or as an alternative, if it is attached to the green area maintenance robot, the border sensing device can be protected from water, in particular by the green area maintenance robot. Also in addition or as an alternative, the green area maintenance robot may have an, in particular water-protected, in particular water-tight, attaching region for the detachable attachment of the border sensing device. Also in addition or as an alternative, the green area maintenance robot and/or the border sensing device may be designed for oriented or aligned attachment. Also in addition or as an alternative, the border sensing device may be referred to as a border detecting device or robot border sensing device. Also in addition or as an alternative, the border sensing device may be designed for interacting with the green area maintenance robot and/or the recording device and/or the control unit.

Also in addition or as an alternative, the recording device may be entirely or partially designed as described above. Also in addition or as an alternative, the recording device may be designed for detachable attachment to the green area maintenance robot and/or the control unit. Also in addition or as an alternative, the recording device may be designed for interacting with the green area maintenance robot and/or the border sensing device and/or the control unit.

Also in addition or as an alternative, the control unit may be entirely or partially designed as described above. Also in addition or as an alternative, the control unit may be designed for comparison of the robot data and the border data. Also in addition or as an alternative, the control unit may be designed for interacting with the green area maintenance robot and/or the border sensing device and/or the recording device.

Also in addition or as an alternative, the area to be maintained may be entirely or partially designed as described above. In addition or as an alternative, the delimiting border may be entirely or partially designed as described above.

Also in addition or as an alternative, the green area maintenance system may have a computing and storing unit, in particular the computing and storing unit. The computing and storing unit may be designed for the purpose of determining and storing a series of data of the delimiting border, in particular at least the section of the delimiting border, of the area to be maintained on the basis of the recorded series of border data of the delimiting border, in particular at least the section of the delimiting border. Also in addition or as an alternative, the computing and storing unit may be entirely or partially designed as described above.

Also in addition or as an alternative, border data, in particular while the border sensing device is detached from the green area maintenance robot and is being guided along the delimiting border, may refer to position-related data of the delimiting border.

Also in addition or as an alternative, robot data, in particular while the border sensing device is attached to the green area maintenance robot, may refer to position-related data of the green area maintenance robot.

Also in addition or as an alternative, the green area maintenance system need not have a motor scythe, or the green area maintenance system may be free of a motor scythe, in particular the motor scythe.

In a development of the invention, the border sensing device is of a portable design. In addition or as an alternative, the recording device is of a portable design. In particular, portable may be used to refer to mobile or hand-guided, in particular hand-held. A hand-guided device, in particular a hand-held device, may mean that the device may have a maximum mass of 50 kilograms (kg), in particular of 20 kg, in particular of 10 kg.

In a development of the invention, the border sensing device comprises a position determining device, in particular the position determining device, for determining position coordinates, in particular of the delimiting border of the area to be maintained. The recording device is designed for the purpose of recording and/or storing a series, in particular the series, of border position coordinates determined by means of the position determining device of the delimiting border, in particular at least the section of the delimiting border. The control unit is designed for the purpose of controlling the movement of the green area maintenance robot on the area to be maintained in dependence in particular on robot position coordinates determined by means of the position determining device and the recorded series of border position coordinates in such a way that the green area maintenance robot stays on the area to be maintained, in particular within the delimiting border. In particular, the position determining device may be designed for detachable attachment to the green area maintenance robot. In addition or as an alternative, the position determining device may be the previously described robot position determining device. Also in addition or as an alternative, the recording device may be the previously described position recording device. Also in addition or as an alternative, border position coordinates, in particular while the positioning determining device is detached from the green area maintenance robot and is being guided along the delimiting border, may refer to position coordinates of the delimiting border. Also in addition or as an alternative, robot position coordinates, in particular while the position determining device is attached to the green area maintenance robot, may refer to position coordinates of the green area maintenance robot.

In a refinement of the invention, the position determining device comprises a satellite position determining receiver for determining position coordinates. In addition or as an alternative, the position determining device comprises a local positioning system device for determining position coordinates. In particular, the satellite position determining receiver may be entirely or partially designed as described above. In addition or as an alternative, the satellite position determining receiver may be referred to as a robot satellite position determining receiver. Also in addition or as an alternative, the local positioning system device may be entirely or partially designed as described above. Also in addition or as an alternative, the local positioning system device may be referred to as a robot local positioning system device.

In a development of the invention, the border sensing device comprises a camera, in particular at least one camera, for recording images, in particular of the delimiting border of the area to be maintained. The recording device is designed for the purpose of recording and/or storing a series of border images recorded by means of the camera of the delimiting border, in particular at least the section of the delimiting border. The control unit is designed for the purpose of controlling the movement of the green area maintenance robot on the area to be maintained in dependence on robot images, in particular recorded by means of the camera, and the recorded series of border images in such a way that the green area maintenance robot stays on the area to be maintained, in particular within the delimiting border. In particular, the camera may be designed for detachable attachment on the green area maintenance robot. In addition or as an alternative, the camera may be referred to as a robot camera. Also in addition or as an alternative, the recording device may be referred to as an image recording device. Also in addition or as an alternative, border images, in particular while the camera is detached from the green area maintenance robot and is being guided along the delimiting border, may refer to images of the delimiting border. Also in addition or as an alternative, robot images, in particular while the camera is attached to the green area maintenance robot, may refer to images, in particular of the delimiting border, recorded by the green area maintenance robot.

In a development of the invention, the green area maintenance system has a guiding device. The guiding device has a user guiding device. The user guiding device is designed for the guiding of the guiding device by the user. Furthermore, the guiding device has an attaching region arranged at a distance from the user guiding device, in particular of a minimum of 50 (centimeters), in particular of a minimum of 100 cm, and/or of a maximum of 200 cm, in particular of a maximum of 150 cm. The border sensing device is designed for detachable attachment to the guiding device in the attaching region. The guiding device makes comfortable or convenient guiding of the border sensing device possible, in particular the border sensing device attached to the guiding device in the attaching region. In particular, the guiding device may make it possible to guide the border sensing device, in particular detached from the green area maintenance robot, at a height and/or a distance, in particular sideways or laterally, with respect to the delimiting border, it being possible for the height to be the same as a height and/or the distance to be the same as a distance when it is attached to the green area maintenance robot, in particular at a subsequent time. In addition or as an alternative, the guiding device may make it possible for the user to remain upright during guiding. In particular, the guiding device may be different from the green area maintenance robot. In particular, the guiding device need not be designed for guiding the green area maintenance robot. In addition or as an alternative, the control unit may be designed for taking into account an offset, in particular a spatial offset, of the attachment of the border sensing device to the guiding device and to the green area maintenance robot or the border data and the robot data. Also in addition or as an alternative, the guiding device and/or the border sensing device may be designed for oriented or aligned attachment. Also in addition or as an alternative, the recording device may be designed for detachable attachment to the guiding device. Also in addition or as an alternative, the user guiding device may be designed for being touched, in particular gripped, by the user, in particular by the user's hand. Also in addition or as an alternative, the user guiding device may be a user carrying device, in particular the user carrying device. The user carrying device may be designed for carrying the guiding device by the user. In particular, the user carrying device may be entirely or partially designed as described above. Also in addition or as an alternative, the guiding device may be a guiding unit, in particular a pole. In particular, the guiding unit may be a green area maintenance device, in particular a brushcutter and/or a grass trimmer and/or a lawn trimmer and/or a grass cutter and/or a lawn cutter and/or grass shears and/or lawn shears. The green area maintenance system may make it possible to maintain a region, in particular the region, of the area to be maintained, in particular a border region and/or edge region, in particular the border region and/or edge region, or the complete area to be maintained by means of the green area maintenance device.

In a refinement of the invention, the guiding device is a motor scythe, in particular the motor scythe. In particular, the motor scythe may be entirely or partially designed as described above. When attached to the motor scythe, the border sensing device, in particular the position determining device, may be referred to as or be a scythe border sensing device, in particular a scythe position determining device, in particular the scythe position determining device. In addition or as an alternative, with the border sensing device attached to the motor scythe, the position-related data, in particular the position coordinates, may be referred to as or be scythe data, in particular scythe position coordinates, in particular the scythe position coordinates. Also in addition or as an alternative, the attachment of the border sensing device or the attaching region may be in the region of the cutting tool, if present.

In a development of the invention, the green area maintenance system has a recording and/or control initiating device. The recording and/or control initiating device is designed for activating and/or deactivating the recording, in particular by means of the recording device. In addition or as an alternative, the recording and/or control initiating device is designed for activating and/or deactivating the control, in particular by means of the control unit. In particular, the recording and/or control initiating device may comprise a user-actuable operating element, in particular a button. In addition or as an alternative, the recording and/or control initiating device may be formed on the green area maintenance robot, the border sensing device, the recording device, the control unit or separately, in particular spatially separately. In particular, the recording and/or control initiating device may be a smartwatch or a smartphone or a tablet or a laptop or a computer. Also in addition or as an alternative, the recording and/or control initiating device may be arranged on the guiding device, if present, in particular the user guiding device thereof. In particular, the guiding unit, in particular the green area maintenance device, in particular the motor scythe, if present, may have a motor, in particular a drive motor, and/or a movable tool, in particular a maintenance tool, in particular a cutting tool, in particular the cutting tool. The recording and/or control initiating device may be designed for detecting an operating state of the drive motor and/or a movement of the tool and, in particular as a consequence thereof, for activating the recording. In addition or as an alternative, the recording and/or control initiating device may be designed for detecting a non-operating state of the drive motor and/or a non-movement of the tool and, in particular as a consequence thereof, for deactivating the recording. Also in addition or as an alternative, the recording and/or control initiating device may be designed for interacting with the recording device and/or the control unit.

In a refinement of the invention, the recording and/or control initiating device is designed for detecting a detachment of the border sensing device from the green area maintenance robot and, in particular as a consequence thereof, for deactivating the control. In addition or as an alternative, the recording and/or control initiating device is designed for detecting an attachment of the border sensing device to the guiding device, if present, in particular in the attaching region, and, in particular as a consequence thereof, for activating the recording. In addition or as an alternative, the recording and/or control initiating device is designed for detecting a detachment of the border sensing device from the guiding device, if present, in particular from the attaching region, and, in particular as a consequence thereof, for deactivating the recording. In addition or as an alternative, the recording and/or control initiating device may be designed for detecting an attachment of the border sensing device to the green area maintenance robot and, in particular as a consequence thereof, for activating the control. This makes a self-reliant or automatic activation and/or a self-reliant or automatic deactivation possible, in particular without the user or without user actuation.

In a development of the invention, the green area maintenance system has an output device, in particular an indicator, in particular a display, and an input device, in particular a user-actuable input device, in particular a keyboard and/or a mouse. The output device is designed for outputting the recorded series of border data and/or a series, in particular the series, of data based on the recorded series of border data, in particular to the user. The input device is designed for processing the recorded series of border data and/or a series, in particular the series, of data based on the recorded series of border data, in particular by the user. In particular, the processing may comprise editing, revising, shifting and/or smoothing. In addition or as an alternative, the output device and the input device may be a combined output/input device, in particular a smartwatch or a smartphone or a tablet or a laptop or a computer, in particular with a touchscreen.

In a development of the invention, the border sensing device comprises a sensing transmission unit for the transmission, in particular cableless or cable-bound transmission, of the sensed position-related data. In addition or as an alternative, the recording device comprises a recording transmission unit for the transmission, in particular cableless or cable-bound transmission, of the border data sensed by means of the border sensing device and/or the recorded series of border data. Also in addition or as an alternative, the control unit comprises a control transmission unit for the transmission, in particular cableless or cable-bound transmission, of the robot data sensed by means of the border sensing device and/or the recorded series of border data and/or a series, in particular the series, of data based on the recorded series of border data. In particular, the sensing transmission unit may be designed for interacting with the recording transmission unit and/or the control transmission unit.

In addition or as an alternative, the recording transmission unit may be designed for interacting with the control transmission unit. Also in addition or as an alternative, the output device may comprise an output transmission unit for the transmission, in particular cableless or cable-bound transmission, of the recorded series of border data and/or of a series, in particular the series, of data based on the recorded series of border data. Also in addition or as an alternative, the input device may comprise an input transmission unit for the transmission, in particular cableless or cable-bound transmission, of the recorded series of border data and/or of a series, in particular the series, of data based on the recorded series of border data.

In a development of the invention, the border sensing device comprises a rechargeable, in particular electrical, in particular electrochemical, energy store, in particular a storage battery, for supplying the detached border sensing device with operating energy, in particular electrical operating energy. In particular, the green area maintenance robot is designed for the recharging, in particular for cableless, in particular inductive, and/or cable-bound recharging, of the energy store of the attached border sensing device.

In a development of the invention, the autonomous mobile green area maintenance robot is designed as a lawnmowing robot, in particular the lawnmowing robot, with a lawnmowing tool, in particular the lawnmowing tool. In particular, the lawnmowing robot may be entirely or partially designed as described above. In addition or as an alternative, the lawnmowing tool may be entirely or partially designed as described above.

The invention further relates to a method, in particular the method, for sensing at least one section, in particular the section, of a delimiting border, in particular the delimiting border, of an area to be maintained, in particular the area to be maintained, in particular by the autonomous mobile green area maintenance robot and/or the motor scythe, if present, by means of a green area maintenance system, in particular the previously described green area maintenance system. The green area maintenance system has an autonomous mobile green area maintenance robot, in particular the autonomous mobile green area maintenance robot, a border sensing device, in particular the border sensing device, for sensing position-related data of the delimiting border and a recording device, in particular the recording device. The border sensing device is designed for detachable attachment to the green area maintenance robot. The recording device is designed for the purpose of recording a series, in particular the series, of border data sensed by means of the border sensing device of the delimiting border. The method according to the invention comprises the steps of: a) Guiding the border sensing device, detached from the autonomous mobile green area maintenance robot, along at least the section of the delimiting border of the area to be maintained, in particular by the user. b) Sensing border data by means of the border sensing device during the guiding. c) Recording the series of border data of the delimiting border, in particular at least of the section of the delimiting border, by means of the recording device.

The method can make possible the same advantages as the previously described green area maintenance system. In particular, the method may have some or all of the features or properties of the green area maintenance system. In addition or as an alternative, the green area maintenance system may be entirely or partially designed as above.

In particular, step c) may be performed at the same time as steps a) and b) and/or at a time thereafter. In addition or as an alternative, the border sensing device may be detached from the green area maintenance robot at a time before step a). Also in addition or as an alternative, the border sensing device may be attached to the green area maintenance robot at a time after step c).

What is more, the invention relates to a method for operating an autonomous mobile green area maintenance robot, in particular the autonomous mobile green area maintenance robot, of a green area maintenance system, in particular the previously described green area maintenance system, on an area to be maintained, in particular the area to be maintained, with a delimiting border, in particular the delimiting border. The method according to the invention comprises the previously described method for sensing at least one section, in particular the section, of the delimiting border. The green area maintenance system has a control unit, in particular the control unit. The control unit is designed for the purpose of controlling a movement, in particular the movement, of the green area maintenance robot on the area to be maintained in dependence on robot data, in particular sensed by means of the border sensing device, and the recorded series of border data while the border sensing device is attached to the green area maintenance robot, in such a way that the green area maintenance robot stays on the area to be maintained, in particular within the delimiting border. Furthermore, the method comprises the step of: Controlling a movement, in particular the movement, of the green area maintenance robot, in particular together with the border sensing device attached to the green area maintenance robot, on the area to be maintained in dependence on robot data, in particular sensed by means of the border sensing device, and the recorded series of border data in such a way that the green area maintenance robot stays on the area to be maintained, in particular within the delimiting border, in particular by means of the control unit.

The method can make possible the same advantages as the previously described green area maintenance system. In particular, the method may have some or all of the features or properties of the green area maintenance system. In addition or as an alternative, the green area maintenance system may be entirely or partially designed as described above.

Further advantages and aspects of the invention emerge from the claims and from the following description of preferred exemplary embodiments of the invention, which are explained below on the basis of the figures.

BRIEF DESCRIPTION OF THE DRAWINGS

FIG. 1 shows a schematic view of a green area maintenance system according to the invention, FIG. 2 shows a schematic view of an autonomous mobile green area maintenance robot according to the invention of the green area maintenance system, FIG. 3 shows a plan view of an area to be maintained by means of the green area maintenance system from FIG. 1 and the green area maintenance robot from FIG. 2, FIG. 4 shows a flow diagram of a method according to the invention, FIG. 9 shows a schematic view of an output and/or input device of the green area maintenance system.

DETAILED DESCRIPTION OF THE DRAWINGS

Figure 5:
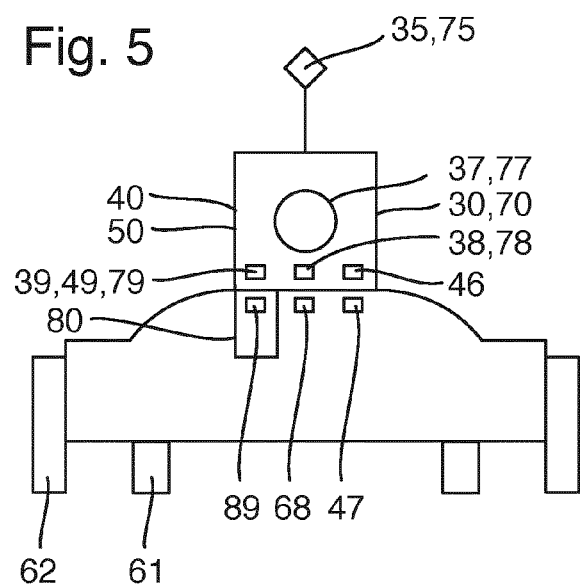
FIG. 5 shows a further schematic view of the green area maintenance robot from FIG. 2.

FIG. 1 to FIG. 3 show a green area maintenance system 10 according to the invention. The green area maintenance system 10 has a motor scythe 20, a scythe position determining device 30 and a position recording device 40. The scythe position determining device 30 is designed for determining scythe position coordinates x1, y1. The scythe position determining device 30 is attached to the motor scythe 20. The position recording device 40 is designed for the purpose of recording a series of scythe position coordinates x1, y1 of the delimiting border 101 while the motor scythe 20 is being guided together with the scythe position determining device 30 along at least one section 102 of a delimiting border 101 of an area to be maintained 100 with lawns, as can be seen at the top right in FIG. 3. In the exemplary embodiment shown, the position recording device 40 is attached to the motor scythe 20, as can be seen in FIG. 1. In alternative exemplary embodiments, the position recording device may be arranged elsewhere; in particular, the position recording device need not be arranged on the motor scythe. The position recording device 40 is designed for interacting with the scythe position determining device 30. The delimiting border 101 delimits or defines the area to be maintained 100 in the form of a grassed area. The motor scythe 20 of the exemplary embodiment shown may be referred to as a lawn trimmer.

Consequently, the green area maintenance system 10 makes it possible to maintain the area 100, in particular at the delimiting border 101 in the form of a border of the lawn, by means of the motor scythe 20. In addition, the green area maintenance system 10 makes it possible to sense at least the section 102 of the delimiting border 101 of the area 100 by means of the scythe position determining device 30 and the position recording device 40.

FIG. 4 shows a method according to the invention for sensing at least the section 102 of the delimiting border 101 of the area 100 by means of the previously described green area maintenance system 10. In a step a), the motor scythe 20 is guided along the section 102, in particular by a user 200, the scythe position determining device 30 being attached to the motor scythe 20. In a step b), scythe position coordinates x1, y1 are determined by means of the scythe position determining device 30 during the guiding. In a step c), the series of scythe position coordinates x1, y1 at least of the section 102 of the delimiting border 101 is recorded by means of the position recording device 40.

Consequently, the method correspondingly makes it possible to maintain the area 100 by means of the motor scythe 20. In addition, the method correspondingly makes it possible to sense at least the section 102 of the delimiting border 101 of the area 100 by means of the scythe position determining device 30 and the position recording device 40.

In detail, the motor scythe 20 has a user carrying device 21. The user carrying device 21 is designed for the carrying of the motor scythe 20 by the user 200. In the exemplary embodiment shown, the user carrying device 21 comprises a handle construction for holding.

Furthermore, the motor scythe 20 has a scythe head 22 with a cutting tool 23. The scythe position determining device 30 is attached in the region of the cutting tool 23, in the exemplary embodiment shown to the scythe head 22. Furthermore, the position recording device 40 is attached in the region of the cutting tool 23, in particular to the scythe head 22. In detail, the cutting tool 23 comprises a mowing line of nylon. The cutting tool 23 is designed as a rotating cutting tool and for the purpose of mowing the area 100 or the delimiting border 101 thereof by the free cutting method, in particular of producing a cutting operation by the centrifugal force of the cutting tool 23. The scythe head 22 of the exemplary embodiment shown may be referred to as a line head. Furthermore, the cutting tool 23 is exposed or unguarded.

The motor scythe 20 also has a motor 24. The motor 24 is designed for driving the motor scythe 20 or the cutting tool 23 thereof. The motor may be an internal combustion engine, in particular a gasoline engine, or an electric motor. Furthermore, the motor scythe 20 has a motor energy source 26. The motor energy source may be a fuel tank, a storage battery and/or a fuel cell.

In addition, the motor scythe 20 has a user operating unit (not represented in detail), which is designed for operating the motor scythe 20, in particular the motor 24 thereof or the cutting tool 23 thereof, by the user 200. The user operating unit is connected in a mechanically fixed, in particular rigid, manner to the cutting tool by means of a, in particular extended, handle or pole.

The scythe position determining device 30 comprises in detail a satellite position determining receiver 31 for determining scythe position coordinates x1, y1. In the exemplary embodiment shown, the green area maintenance system 10 has a further satellite position determining receiver 95. The further satellite position determining receiver 95 is arranged stationarily in the region of the area 100. The satellite position determining receiver 31 and the further satellite position determining receiver 95 are designed for the purpose of being in signaling connection with one another in order to make a relatively accurate position determination possible.

In addition, the scythe position determining device 30 comprises a local positioning system device 35 for determining scythe coordinates x1, y1. In the exemplary embodiment shown, the local positioning system device 35 is a passive element. Furthermore, the green area maintenance system 10 comprises active elements 36a, b, c, d, e, f, g, h, which are arranged in corners of the area 100. The local positioning system device 35 and the active elements 36a-h are designed for the purpose of interacting with one another in order to make a position determination possible. In alternative exemplary embodiments, it may be sufficient that the scythe position determining device may only comprise the satellite position determining receiver or only the local positioning system device.

Furthermore, the green area maintenance system 10 has a computing and storing unit 50. The computing and storing unit 50 is designed for the purpose of determining and storing a series of delimiting border coordinates x2, y2 of at least the section 102 of the delimiting border 101 of the area to be maintained 100 on the basis of the recorded series of scythe position coordinates x1, y1 at least of the section 102 of the delimiting border 101. In the exemplary embodiment shown, the computing and storing unit 50 is attached to the motor scythe 20, in particular to the scythe head 22. In alternative exemplary embodiments, the computing and storing unit may be arranged elsewhere; in particular, the computing and storing unit need not be arranged on the motor scythe. The computing and storing unit 50 is designed for interacting with the position recording device 40.

Correspondingly, the method comprises a step d), in which the series of delimiting border coordinates x2, y2 of at least the section 102 of the delimiting border 101 of the area to be maintained 100 is determined and stored on the basis of the recorded series of scythe position coordinates x1, y1 at least of the section 102 of the delimiting border 101 by means of the computing and storing unit 50.

What is more, the green area maintenance system 10 has a scythe transmission unit 25. The scythe transmission unit 25 is designed for interacting with the computing and storing unit 50 and for the data transmission, in particular wireless data transmission, of the series of delimiting border coordinates x2, y2. In the exemplary embodiment shown, the scythe transmission unit 25 is attached to the motor scythe 20, in particular to the scythe head 22. In alternative exemplary embodiments, the scythe transmission unit may be arranged elsewhere; in particular, the scythe transmission unit need not be arranged on the motor scythe.

In the exemplary embodiment shown, the scythe position determining device 30, the position recording device 40, the computing and storing unit 50 and the scythe transmission unit 25 are formed together as one component. This component is of a portable design, or is designed for detachable attachment to the motor scythe 20, in particular to the scythe head 22. Furthermore, the component has a button 45. The button 45 is designed for activating the scythe position determining device 30, the position recording device 40 and the computing and storing unit 50. In addition, the button 45 is designed for deactivating the scythe position determining device 30, the position recording device 40 and the computing and storing unit 50 and also for activating the scythe transmission unit 25 for a limited time.

Furthermore, the green area maintenance system 10 has an autonomous mobile green area maintenance robot 60, a robot position determining device 70 and a control unit 80, as can be seen in FIG. 2. The robot position determining device 70 is designed for determining robot position coordinates x3, y3. The robot position determining device 70 is mounted on the green area maintenance robot 60. The control unit 80 is designed for the purpose of controlling a movement of the green area maintenance robot 60 on the area to be maintained 100 in dependence on the determined robot position coordinates x3, y3, and the determined and stored series of delimiting border coordinates x2, y2, at least of the section 102 of the delimiting border 101, in such a way that the green area maintenance robot 60 stays on the area 100, in particular within the delimiting border 101. In the exemplary embodiment shown, the green area maintenance robot 60 comprises the control unit 80. The control unit 80 is designed for interacting with the robot position determining device 70.

Consequently, the green area maintenance system 10 makes it possible for the area 100 to be autonomously maintained by means of the autonomous mobile green area maintenance robot 60.

In detail, the autonomous mobile green area maintenance robot 60 is designed as a lawnmowing robot with a lawnmowing tool 63, in particular as a mulching mowing robot. The lawnmowing tool 63 is different from the cutting tool 23. In the exemplary embodiment shown, the lawnmowing tool 63 comprises a metal cutting blade with cutting teeth. The lawnmowing tool 63 is designed as a rotating lawnmowing tool and for the purpose of mowing the area to be maintained 100 by the free cutting method, in particular of producing a cutting operation by the centrifugal force of the lawnmowing tool 63.

The autonomous mobile green area maintenance robot 60 also has front running wheels 61, which are pivotable, and rear running wheels 62, which are driven separately from one another. Consequently, the autonomous mobile green area maintenance robot 60 can automatically move and steer itself on the area 100. Furthermore, the green area maintenance robot 60 has an electric motor (not shown) for driving the lawnmowing tool 63. In alternative exemplary embodiments, the green area maintenance robot may have an internal combustion engine, in particular a gasoline engine, for driving the lawnmowing tool 63. What is more, the green area maintenance robot 60 has a rechargeable battery (not shown) for supplying driving energy to the rear running wheels 62 and the electric motor for driving the lawnmowing tool 63. In alternative exemplary embodiments, the green area maintenance robot may have a fuel cell or some other kind of driving energy source for supplying driving energy.

Furthermore, the green area maintenance system 10 has a base station 90 for the autonomous mobile green area maintenance robot 60, which here is arranged at the delimiting border 101 of the area 100, as can be seen at the top left of FIG. 3. In the exemplary embodiment shown, the base station 90 is designed as a charging station for the recharging, in particular automatic recharging, of the rechargeable battery of the green area maintenance robot 60.

In detail, the base station 90 has the further satellite position determining receiver 95. The robot position determining device 70 comprises a robot satellite position determining receiver 71 for determining robot position coordinates x3, y3. The robot satellite position determining receiver 71 and the further satellite position determining receiver 95 are designed for the purpose of being in signaling connection with one another in order to make a relatively accurate position determination possible. In addition, the robot position determining device 70 comprises a robot local positioning system device 75 for determining robot position coordinates x3, y3. In the exemplary embodiment shown, the robot local positioning system device 75 is a passive element. The robot local positioning system device 75 and the active elements 36*a, h* are designed for the purpose of interacting with one another in order to make a position determination possible. In alternative exemplary embodiments, it may be sufficient that the robot position determining device may only comprise the robot satellite position determining receiver or only the robot local positioning system device.

What is more, the green area maintenance system 10 has a robot transmission unit 65. The robot transmission unit 65 is designed for interacting with the control unit 80 and for the data transmission, in particular wireless data transmission, of the series of delimiting border coordinates x2, y2. The scythe transmission unit 25 and the robot transmission unit 65 are designed for the data transmission from the scythe transmission unit 25 to the robot transmission unit 65. In the exemplary embodiment shown, the robot transmission unit 65 is attached to the green area maintenance robot 60. In alternative exemplary embodiments, the robot transmission unit may be arranged elsewhere; in particular, the robot transmission unit need not be arranged on the green area maintenance robot.

In the exemplary embodiment shown, the robot position determining device 70 and the robot transmission unit 65 are formed together as one component. This component is of a portable design, or is designed for detachable attachment to the green area maintenance robot 60. In particular, this component that is attached to the green area maintenance robot 60 is structurally identical to the component attached to the motor scythe 20.

In the present case, the series of delimiting border coordinates x2, y2 are transmitted from the scythe transmission unit 25 to the robot transmission unit 65. In alternative exemplary embodiments, it may be sufficient that the green area maintenance system may have only one portable component. In particular after sensing at least the section 102 of the delimiting border 101 of the area to be maintained 100, this component may be detached from the motor scythe 20 and attached to the autonomous mobile green area maintenance robot 60. In this case, the scythe position determining device may form the robot position determining device.

Furthermore, FIGS. 1 to 3 and in addition FIGS. 5 and 7 to 9 show a green area maintenance system according to the invention, in particular the green area maintenance system 10 according to the invention. The green area maintenance system 10 has an autonomous mobile green area maintenance robot, in particular the autonomous mobile green area maintenance robot 60, a border sensing device, in particular the border sensing device 30, 70, a recording device, in particular the recording device 40, and a control unit, in particular the control unit 80. The border sensing device 40 is designed for sensing position-related data x1, y1, x3, y3, B1, B3 at least of the section 102 of the delimiting border 101 of the area to be maintained 102. Furthermore, the border sensing device 30, 70 is designed for detachable attachment to the green area maintenance robot 60. The recording device 40 is designed for the purpose of recording a series, in particular the series, of border data x1, y1, B1 sensed by means of the border sensing device 30, 70 of the delimiting border 101, as can be seen at the top right in FIG. 3, while the border sensing device 30, 70 is detached from the green area maintenance robot 60 and is being guided along at least the section 102 of the delimiting border 101. The control unit 80 is designed for the purpose of controlling a movement, in particular the movement, of the green area maintenance robot 60 on the area to be maintained 100 in dependence on robot data x3, y3, B3, in particular sensed by means of the border sensing device 30, 70, and the recorded series of border data x1, y1, x2, y2, B1 while the border sensing device 30, 70 is attached to the green area maintenance robot 60 in such a way that the green area maintenance robot 60 stays on the area to be maintained 100, in particular within the delimiting border 101. In the exemplary embodiment shown, the green area maintenance robot 60 comprises the control unit 80.

Consequently, the green area maintenance system 10 can make it possible to make do with the, in particular single, border sensing device 30, 70; or the, in particular single, border sensing device 30, 70 may be sufficient.

Furthermore, FIG. 4 shows a method, in particular the method according to the invention, for sensing at least the section 102 of the delimiting border 101 of the area 100 by means of a green area maintenance system, in particular the previously described green area maintenance system 10. In a step, in particular the step a), the border sensing device 30, 70 detached from the green area maintenance robot 60 is guided along at least the section 102 of the delimiting border 101 of the area 100, in particular by the user. In a step, in particular the step b), border data x1, y1, B1 are sensed by means of the border sensing device 30, 70 during the guiding. In a step, in particular the step c), the series of border data x1, y1, B1 at least of the section 102 of the delimiting border 101 are recorded by means of the recording device 40.

What is more, a method according to the invention for operating a green area maintenance robot, in particular the green area maintenance robot 60, on the area 100 with the delimiting border 101 comprises the previously described method for sensing at least the section 102 of the delimiting border 101. What is more, the method comprises the step of: Controlling a movement, in particular the movement, of the green area maintenance robot 60 together with the border sensing device 30, 70 attached to the green area maintenance robot 60 on the area 100 in dependence on robot data x3, y3, B3, in particular sensed by means of the border sensing device 30, 70, and the recorded series of border data x1, y1, x2, y2, B1, in such a way that the green area maintenance robot stays on the area 100, in particular by means of the control unit 80.

In detail, the border sensing device 30, 70 is of a portable design.

The recording device 40 is also of a portable design.

Furthermore, the border sensing device 30, 70 comprises a position determining device, in particular the position determining device, in particular the robot position determining device, for determining position coordinates x1, y1, x3, y3. The recording device 40, in particular the position recording device, is designed for the purpose of recording a series, in particular the series, of border position coordinates x1, y1 determined by means of the position determining device 30, 70 at least of the section 102 of the delimiting border 101. The control unit 80 is designed for the purpose of controlling the movement of the green area maintenance robot 60 on the area 100 in dependence on robot position coordinates x3, y3, in particular determined by means of the position determining device 30, 70, and the recorded series of border position coordinates x1, y1, x2, y2 in such a way that the green area maintenance robot 60 stays on the area 100.

In detail, the position determining device 30, 70 comprises a satellite position determining receiver, in particular the satellite position determining receiver 31, 71, in particular the robot satellite position determining receiver, for determining position coordinates x1, y1, x3, y3. In addition, the position determining device 30, 70 comprises a local positioning system device, in particular the local positioning system device 35, 75, in particular the robot local positioning system device, for determining position coordinates x1, y1, x3, y3. In alternative exemplary embodiments, it may be sufficient that the position determining device may only comprise the satellite position determining receiver or only the local positioning system device.

Figure 6:
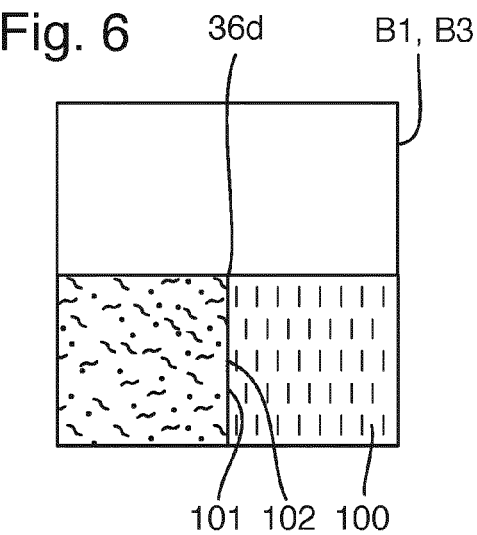
FIG. 6 shows an image of a delimiting border of the area from FIG. 3.

What is more, the border sensing device 30, 70 comprises a camera 37, 77 for recording images B1, B3 at least of the section 102 of the delimiting border 101 of the area 100, as can be seen in FIGS. 5 and 6. The recording device 40 is designed for the purpose of recording a series of border images B1 recorded by means of the camera at least of the section 102 of the delimiting border 101. The control unit 80 is designed for the purpose of controlling the movement of the green area maintenance robot 60 on the area 100 in dependence on robot images B3, in particular recorded by means of the camera, and the recorded series of border images B1 in such a way that the green area maintenance robot 60 stays on the area 100. In alternative exemplary embodiments, it may be sufficient that the border sensing device may only comprise the position determining device or only the camera.

Figure 7:
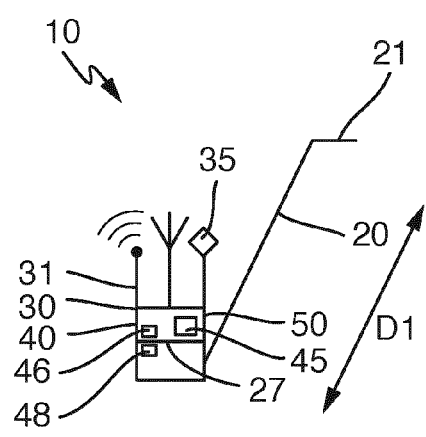
FIG. 7 shows a schematic view of a guiding device in the form of a guiding pole of the green area maintenance system.
Figure 8:
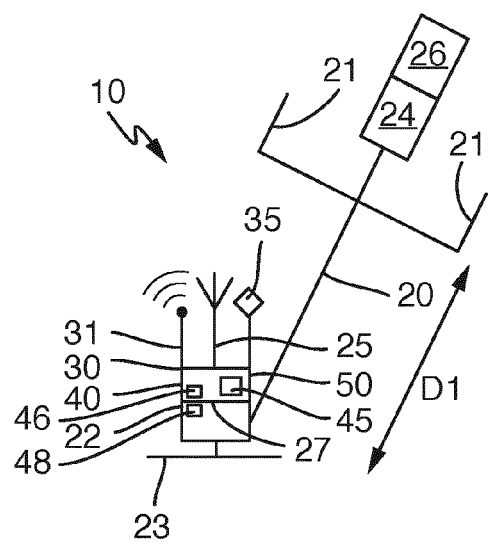
FIG. 8 shows a schematic view of a guiding device in the form of a motor scythe of the green area maintenance system.

Furthermore, the green area maintenance system 10 has a guiding device, in particular at least one guiding device 20, in FIG. 7 a guiding unit in the form of a pole and in FIG. 8 the motor scythe. The guiding device 20 has a user guiding device 21, in particular the user carrying device. The user guiding device 21 is designed for the guiding of the guiding device 20 by the user 200. What is more, the guiding device 20 has an attaching region 27 arranged at a distance D1 from the user guiding device 21. The border sensing device 30, 70 is designed for detachable attachment to the guiding device 20 in the attaching region 27.

The green area maintenance system 10 also has a recording and/or control initiating device, in particular the recording and/or control initiating device 45, 46. The recording and/or control initiating device 45, 46 is designed for activating and/or deactivating the recording, in particular by means of the recording device 40, and/or the control, in particular by means of the control unit 80.

In detail, the recording initiating device comprises a user-actuable operating element, in particular the user-actuable operating element, in particular a button, in particular the button 45.

Furthermore, the recording and/or control initiating device 46 is designed for detecting a detachment of the border sensing device 30, 70 from the green area maintenance robot 60 and for deactivating the control, as can be seen in FIG. 5. In addition or as an alternative, the recording and/or control initiating device 46 is designed for detecting an attachment of the border sensing device 30, 70 to the guiding device 20 and for activating the recording, as can be seen in FIGS. 7 and 8. In addition or as an alternative, the recording and/or control initiating device 46 is designed for detecting a detachment of the border sensing device 30, 70 from the guiding device 20 and for deactivating the recording. In addition or as an alternative, the recording and/or control initiating device 46 is designed for detecting an attachment of the border sensing device 30, 70 to the green area maintenance robot 60 and for activating the control. In alternative exemplary embodiments, it may be sufficient that the recording initiating device may only comprise the user-actuable operating element or may only be designed for detection.

What is more, the green area maintenance system 10 has an output device 98 and an input device 99, as can be seen in FIG. 9. The output device 98 is designed for outputting the recorded series of border data x1, y1, B1 and/or a series, in particular the series, of data x2, y2 based on the recorded series of border data. The input device 99 is designed for processing the recorded series of border data x1, y1, B1 and/or a series, in particular the series, of data x2, y2 based on the recorded series of border data. In alternative exemplary embodiments, it may be sufficient that the green area maintenance system may only comprise the computing and storing unit or only the output device and the input device. In the exemplary embodiment shown, the output device 98 and the input device 99 are a combined output/input device, in particular a smartphone, in particular with a touchscreen.

Furthermore, the border sensing device 30, 70 comprises a sensing transmission unit 39, 79 for the transmission, in particular cableless transmission, of the sensed position-related data x1, y1, x3, y3, B1, B3. In addition or as an alternative, the recording device 40 comprises a recording transmission unit 49 for the transmission, in particular cableless transmission, of the border data x1, y1, B1 sensed by means of the border sensing device and/or the recorded series of border data x1, y1, B1. Also in addition or as an alternative, the control unit 80 comprises a control transmission unit 89 for the transmission, in particular cableless transmission, of the robot data x3, y3, B3 sensed by means of the border sensing device and/or the recorded series of border data x1, y1, B1 and/or a series, in particular the series, of data x2, y2 based on the recorded series of border data.

The border sensing device 30, 70 also comprises a rechargeable energy store 38, 78, in particular a storage battery, for supplying the detached border sensing device 30, 70 with operating energy, in particular electrical operating energy. In particular, the green area maintenance robot 60 is designed for the recharging, in particular inductive recharging, of the energy store 38, 78 of the attached border sensing device 30, 70. In the exemplary embodiment shown, the green area maintenance robot 60 comprises a charging unit, in particular an inductive charging unit 68, for the recharging, in particular inductive recharging, of the energy store 38, 78.

In detail, the autonomous mobile green area maintenance robot 60 is designed as a lawnmowing robot, in particular the lawnmowing robot, with a lawnmowing tool, in particular the lawnmowing tool 63.

In the exemplary embodiment shown, the border sensing device 30, 70 and the recording device 40 are formed together as one component. This component is designed for detachable attachment to the green area maintenance robot 60, in particular is of a portable design. In FIG. 5, the border sensing device 30, 70 or the component is attached to the green area maintenance robot 60. In addition, this component is designed for detachable attachment to the guiding device 20, in particular the guiding pole and/or the motor scythe, in the attaching region 27. In FIGS. 7 and 8, the border sensing device 30, 70 or the component is attached to the guiding device 20, in particular the guiding pole or the motor scythe, in the attaching region 27. What is more, in the exemplary embodiment shown, this component has the computing and storing unit 50. In the exemplary embodiment shown, this component also has the recording and/or control initiating device 45, 46.

In addition, in the exemplary embodiment shown, the green area maintenance robot 60 has a robot detection element 47 and/or the guiding device 20 or the guiding pole and/or the motor scythe has/have, in particular in the attaching region 27, a guiding detection element, in particular a respective guiding detection element 48. In detail, the recording and/or control initiating device 46 is designed for the detection, in particular contactless detection, of the robot detection element 47 and/or the guiding detection element 48, in particular for differentiating between the robot detection element 47 and the guiding detection element 48. In the exemplary embodiment shown, the recording and/or control initiating device 46 comprises a magnetic field sensor, in particular a Hall sensor, and the detection element, in particular the respective detection element 47, 48, is a magnetic detection element, in particular a permanent magnet. In detail, a magnetic field of the robot detection element 47 is aligned in FIG. 5 with a magnetic north pole upward and a magnetic south pole downward. A magnetic field of the guiding detection element 48 is aligned in FIGS. 7 and 8 with a magnetic north pole downward and a magnetic south pole upward.

In the exemplary embodiment shown, the sensing transmission unit 39, 79 also is the recording transmission unit 49.

The recording and/or control initiating device 46 is also designed for interacting with the recording device 40 and/or the control unit 80, in particular by means of the sensing transmission unit 39, 79, the recording transmission unit 49 and/or the control transmission unit 89. In the exemplary embodiment shown, this component or the border sensing device 30, 70 or the sensing transmission unit 39, 79 thereof or the recording device 40 or the recording transmission unit 49 thereof is designed for transmitting the sensed position-related data, in particular the robot data, x1, y1, x3, y3, B1, B3 and/or the recorded series of border data x1, y1, B1 and/or the series of data x2, y2 based on the recorded series of border data, when it is attached to the green area maintenance robot 60, and consequently for activating the control, and for not transmitting when it is detached from the green area maintenance robot 60, and consequently for deactivating the control. The control unit 80 is designed for controlling when there is transmission of the sensed position-related data, in particular the robot data, x1, y1, x3, y3, B1, B3 and/or the recorded series of border data x1, y1, B1 and/or the series of data x2, y2 based on the recorded series of border data, and for not controlling when there is no transmission.

As the exemplary embodiments shown and explained above make clear, the invention provides an advantageous green area maintenance system that has improved properties, in particular more functionalities, and also a method for sensing at least one section of a delimiting border of an area to be maintained by means of a green area maintenance system, in particular such a green area maintenance system, and a method for operating an autonomous mobile green area maintenance robot of a green area maintenance system, in particular such a green area maintenance system, on the area. In particular, the green area maintenance system and the method make it possible to maintain a region of the area to be maintained, in particular a border region and/or edge region, or the complete area to be maintained by means of the motor scythe and to sense the delimiting border, in particular the at least one section of the delimiting border, of the area to be maintained by means of the scythe position determining device and the position recording device. What is more, the green area maintenance system and the method can make it possible to make do with the, in particular single, border sensing device; or the, in particular single, border sensing device may be sufficient.

What is claimed is:

1. A green area maintenance system, comprising:
   a motor scythe;
   a scythe position determining device for determining scythe position coordinates, the scythe position determining device being attached to the motor scythe; and
   a position recording device, the position recording device being designed for recording a series of scythe position coordinates of a delimiting border while the motor scythe is being guided together with the scythe position determining device along the delimiting border of an area to be maintained.

2. The green area maintenance system as claimed in claim 1, wherein
   the motor scythe has a user carrying device, the user carrying device being designed for carrying the motor scythe by the user.

3. The green area maintenance system as claimed in claim 1, wherein
   the motor scythe has a scythe head with a cutting tool, the scythe position determining device being attached in a region of the cutting tool.

4. The green area maintenance system as claimed in claim 1, wherein
   the scythe position determining device comprises a satellite position determining receiver for determining scythe position coordinates.

5. The green area maintenance system as claimed in claim 4, wherein
   wherein the scythe position determining device further comprises a local positioning system device for determining scythe position coordinates.

6. The green area maintenance system as claimed in claim 5, further comprising:
   a computing and storing unit, the computing and storing unit being designed for determining and storing a series of delimiting border coordinates of the delimiting border of the area to be maintained on the basis of the recorded series of scythe position coordinates of the delimiting border.

7. The green area maintenance system as claimed in claim 1, wherein
   wherein the scythe position determining device comprises a local positioning system device for determining scythe position coordinates.

8. The green area maintenance system as claimed in claim 1, further comprising:
   a computing and storing unit, the computing and storing unit being designed for determining and storing a series of delimiting border coordinates of the delimiting border of the area to be maintained on the basis of the recorded series of scythe position coordinates of the delimiting border.

9. The green area maintenance system as claimed in claim 8, further comprising:
   an autonomous mobile green area maintenance robot;
   a robot position determining device for determining robot position coordinates, the robot position determining device being attached to the green area maintenance robot; and
   a control unit, the control unit being designed for controlling a movement of the green area maintenance robot on the area to be maintained in dependence on:
   the determined robot position coordinates, and
   the recorded series of scythe position coordinates of the delimiting border and/or the determined and stored series of delimiting border coordinates of the delimiting border, such that the green area maintenance robot stays on the area to be maintained.

10. The green area maintenance system as claimed in claim 9, further comprising one or both of:
- a scythe transmission unit, the scythe transmission unit being designed for interacting with one or more of the scythe position determining device, the position recording device and the computing and storing unit and for data transmission of one or more of the scythe position coordinates, the series of scythe position coordinates and the series of delimiting border coordinates, and
- a robot transmission unit, the robot transmission unit being designed for interacting with the control unit and for the data transmission of one or more of the scythe position coordinates, the series of scythe position coordinates and the series of delimiting border coordinates.

11. The green area maintenance system as claimed in claim 9, wherein
the scythe position determining device is of a portable design, and forms the robot position determining device, and/or
the position recording device is of a portable design.

12. The green area maintenance system as claimed in claim 9, wherein
the autonomous mobile green area maintenance robot is a lawnmowing robot with a lawnmowing tool.

13. A method for sensing at least one section of a delimiting border of an area to be maintained by a green area maintenance system comprising a motor scythe, a scythe position determining device for determining scythe position coordinates, and a position recording device, the position recording device being designed for recording a series of scythe position coordinates of a delimiting border of an area to be maintained, the method comprising the steps of:
a) guiding the motor scythe along the section, the scythe position determining device being attached to the motor scythe;
b) determining the scythe position coordinates by way of the scythe position determining device during the guiding; and
c) recording the series of scythe position coordinates of the delimiting border by way of the position recording device.

14. The method as claimed in claim 13, the method further comprising the step of:
d) determining and storing, by way of a computing and storing unit, a series of delimiting border coordinates of the delimiting border of the area to be maintained on the basis of the recorded series of scythe position coordinates of the delimiting border.

* * * * *